United States Patent
Ferrand et al.

(10) Patent No.: US 10,228,812 B2
(45) Date of Patent: Mar. 12, 2019

(54) DEVICE FOR ASSISTING IN THE DETECTION OF OBJECTS PLACED ON THE GROUND FROM IMAGES OF THE GROUND TAKEN BY A WAVE REFLECTION IMAGING DEVICE

(71) Applicant: THALES, Courbevoie (FR)

(72) Inventors: Julien Ferrand, Plouzane (FR); Ludovic Marchal, Brest (FR)

(73) Assignee: THALES, Courbevoie (FR)

( * ) Notice: Subject to any disclaimer, the term of this patent is extended or adjusted under 35 U.S.C. 154(b) by 539 days.

(21) Appl. No.: 14/909,569

(22) PCT Filed: Jul. 29, 2014

(86) PCT No.: PCT/EP2014/066289
§ 371 (c)(1),
(2) Date: Feb. 2, 2016

(87) PCT Pub. No.: WO2015/014849
PCT Pub. Date: Feb. 5, 2015

(65) Prior Publication Data
US 2016/0202846 A1      Jul. 14, 2016

(30) Foreign Application Priority Data
Aug. 2, 2013 (FR) ...................... 13 01865

(51) Int. Cl.
*G06F 3/0481* (2013.01)
*G01S 7/04* (2006.01)
(Continued)

(52) U.S. Cl.
CPC .............. *G06F 3/0481* (2013.01); *G01S 7/04* (2013.01); *G01S 7/51* (2013.01); *G01S 7/56* (2013.01);
(Continued)

(58) Field of Classification Search
CPC ...... G01S 13/9035; G01S 7/412; G01S 13/90; G01S 15/8902; G01S 7/41; G01S 7/527; G06K 9/3241; G06K 9/4604; G06K 9/48; G06K 9/72; G06K 9/0063; G06K 9/4609
USPC ........................................................ 342/183
See application file for complete search history.

(56) References Cited

U.S. PATENT DOCUMENTS

| 4,030,096 A | 6/1977 | Stevens et al. |
| 5,937,078 A | 8/1999 | Hyland et al. |

(Continued)

*Primary Examiner* — Timothy X Pham
(74) *Attorney, Agent, or Firm* — Baker & Hostetler LLP

(57) ABSTRACT

A device for assisting with the detection of a sought object on the ground, said object having a first preset height, comprising:
a display device configured to display an image (12) generated from echoes measured by a device for imaging reflected waves, the image (12) representing the intensities of echoes generated by the observed zone and extending at least along a distance axis (d) representing the oblique distances separating the reflected-wave imaging device from echo-generating reflectors, the display device allowing a cursor (14) to be displayed superposed on said image on said screen; and
a computational module configured to determine an expected length (w), along the distance axis (d), of an expected shadow (19, 20) projected in the image (12) by the sought object assuming that the sought object is positioned at a sighted position on the ground corresponding to the position of the observed zone associated with a position (P) designated by the cursor (14), the cursor (14) comprising at least one gauge (142) of the expected shadow, which gauge is dimensioned and arranged so as to allow an operator to verify that a shadow projected in the image (12) in the vicinity of the designated position (P) has the expected length along the distance axis (d).

18 Claims, 6 Drawing Sheets

(51) Int. Cl.
*G01S 7/51* (2006.01)
*G01S 7/56* (2006.01)
*G01S 13/89* (2006.01)
*G01S 15/89* (2006.01)
*G01S 17/89* (2006.01)
*G06F 3/0484* (2013.01)
*G06T 7/62* (2017.01)

(52) U.S. Cl.
CPC .............. *G01S 13/89* (2013.01); *G01S 15/89* (2013.01); *G01S 17/89* (2013.01); *G06F 3/04842* (2013.01); *G06T 7/62* (2017.01); *G06T 2207/10024* (2013.01); *G06T 2207/20101* (2013.01); *G06T 2207/20104* (2013.01); *G06T 2207/30184* (2013.01)

(56) References Cited

U.S. PATENT DOCUMENTS

| | | | |
|---|---|---|---|
| 6,573,855 B1 * | 6/2003 | Hayakawa | G01S 13/88 342/176 |
| 6,756,934 B1 | 6/2004 | Chen et al. | |
| 2003/0202426 A1 * | 10/2003 | Ishihara | G01S 15/96 367/103 |
| 2011/0037732 A1 * | 2/2011 | Takama | G06F 3/0412 345/175 |
| 2013/0004017 A1 | 1/2013 | Medasani et al. | |
| 2013/0300870 A1 * | 11/2013 | Messely | G01S 7/2955 348/148 |
| 2014/0354471 A1 * | 12/2014 | Nishiyama | G01S 7/12 342/25 A |
| 2015/0067597 A1 * | 3/2015 | Okuda | G01S 7/04 715/810 |

\* cited by examiner

DEVICE FOR ASSISTING IN THE DETECTION OF OBJECTS PLACED ON THE GROUND FROM IMAGES OF THE GROUND TAKEN BY A WAVE REFLECTION IMAGING DEVICE

CROSS-REFERENCE TO RELATED APPLICATIONS

This application is a National Stage of International patent application PCT/EP2014/066289, filed on Jul. 29, 2014, which claims priority to foreign French patent application No. FR 1301865, filed on Aug. 2, 2013, the disclosures of which are incorporated by reference in their entirety.

FIELD OF THE INVENTION

The field of the invention is that of assistance with the detection of objects on the ground in images of the ground obtained by means of a device for imaging reflected waves.

BACKGROUND

Devices for detecting reflected waves especially include sonars, radars and lidars. A device for imaging reflected waves comprises an emitter emitting wave trains, i.e. wave pulses. The wave trains or wave pulses are acoustic pulses in the case of sonars, and electromagnetic pulses in the case of radars and lidars. The emitter is arranged so as to emit at least one wave pulse toward an observed zone of the ground with a grazing incidence. These waves are reflected by the ground or objects on the ground and the imaging device comprises a receiver that measures the echoes reflected by the irradiated zone.

The ground may be located above water level in the case of radars and be the seabed in the case of sonars.

The invention is especially applicable to assistance with the detection of objects on the ground in images of the ground obtained by a side-looking device for imaging waves reflected from the ground. Such an imaging device is shown in FIG. 1. The imaging device 13 comprises an emitter 2 and a receiver 3 that are mounted on a carrier 4 moving above the ground 5 in a direction of advance D. The imaging device 13 is mounted on the carrier 4 so that the emitter 2 and the receiver 3 point, in a pointing direction Po, along a plane substantially perpendicular to the direction of advance D of the carrier. This, for example, is the case of side-scan sonars mounted on a carrier moving above the seabed, and of side-looking radars mounted on an aircraft moving above the ground.

The emitter 2 emits incident wave pulses at regular time intervals and the receiver has a directivity that is wide aperture in the vertical plane, i.e. in elevation, and very narrow in the horizontal plane, i.e. parallel to the direction of advance of the carrier, or its bearing. In other words, on each emitted wave pulse, the receiver forms an elementary channel measuring the echoes emitted by an elementary observed zone ZOi (i=1 to 3 in FIG. 1) that extends longitudinally along a direction contained in the same plane as the pointing direction Po beside the carrier. The emitter and receiver occupy substantially the same position, referred to as the position of the imaging device. In other words, they are arranged so that the emitter can intercept direct paths from the elementary observed zones. A direct path is a return wave following the same path as the incident wave that excited it. Each elementary observed zone ZOi extends widthwise parallel to the direction of advance of the carrier D. The elementary observation zone ZOi has a very thin width in the direction of advance of the carrier. Each elementary observed zone ZOi is the zone of the ground that is comprised in an elementary observation sector Si (only one of which S3 is shown in FIG. 1) having a narrow aperture in azimuth and a wide aperture in elevation. The echoes collected following the emission of an incident wave pulse and the reception, via an elementary reception channel of index i, represent the reflectivity of the bed along the elementary band in the elementary observed zone ZOi of index i.

Conventionally, devices for assisting with the detection of objects on the ground comprise a display device allowing an image representing the intensities of the echoes generated by the ground in an observed zone of the ground to be displayed, on a screen, at least along a distance axis d representing distances separating the imaging device from a reflector. An exemplary displayed image is shown in FIG. 2. The image 12 consists of a juxtaposition of elementary bands Bi that are also referred to as elementary channels Bi. The limits between the various bands Bi are represented by dotted lines in FIG. 2 because they are not visible in the images. Each elementary band Bi is a representation of the intensities of the echoes generated from an elementary observation zone ZOi under the effect of the incident pulse, which echoes are measured by forming a single elementary reception channel. Each channel represents the reflectivity of the ground between a minimum range distance dmin and a maximum range distance dmax of the imaging device. The elementary bands Bi extend longitudinally along the distance axis d, which is representative of the oblique distance separating the imaging device 2, 3 from echo-generating reflectors in the elementary observed zone ZOi during the formation of the associated elementary reception channel. FIG. 1 shows the oblique distance do separating the imaging device 13 from a point s of the ground in the sector S3. The image 12 is produced band-by-band with the movement of the vehicle. It is what is referred to as a "waterfall" image. Each band is acquired separately by the same periodic process consisting in emitting a wave pulse and in intercepting the echoes excited by this pulse.

Any echo detected in an elementary observed zone ZOi shows up as a bright spot in the corresponding elementary band of the image. The absence of echoes is represented by a dark zone on the screen. The background of the image is normally of intermediate intensity, since it represents the reverberation background but it is shown in white in FIG. 2 for greater clarity. A very advantageous effect of the emission of wave pulses with a grazing incidence is that projected shadows are formed in the image. If an object 6 on the ground 5 has a sufficient height h, it will emit echoes that will be displayed as a bright zone 7 on the screen (represented by dots in FIG. 2). Such an object intercepts a portion of the emitted wave, thereby preventing backscattering by the bed masked by the object beyond the object. The echo received by the receiver will be of a very low level over a certain duration, this showing up in the image as a dark zone 8 that is referred to as the image of the shadow projected in the image by the object 8 (represented by the hatched zone in FIG. 2). The shadow 8 projected by the object in the image may here be defined to be the image of that zone of the ground which the object 7 in question screens, preventing its irradiation by the incident wave pulse. This effect is highly advantageous in any application for detecting and classifying objects on the bed. This allows a noteworthy object to be located not by the echo that it reflects but by the shadow that it generates in the image. Shadow detection is particularly advantageous for locating certain objects, certain stealth submarine mines or stealth planes in particular, which reflect little or no radiation but that nevertheless screen and therefore produce a shadow. However, a drawback of shadow detection is that the size of the shadows in the images varies greatly, especially depending on the geography of the observed zone and the position of the imaging device relative to the observed zone. In other words, the variation in the size of the shadow of a noteworthy object having known dimensions as a function of its position in an image is not easily predictable by an operator, who encounters a certain number of difficulties detecting a noteworthy object in an image. By "detecting a noteworthy object in an image", what is meant is identifying in the image the position of the image of an object having the dimensions of the noteworthy object.

Solutions for assisting an operator with detection of a noteworthy object on a screen do exist. A first type of solution consists of a tool allowing the operator to select the image of a noteworthy object on the screen and to designate the limits of the image of this object or of the image of its shadow on the screen. A processor then evaluates the dimensions of the associated noteworthy object, especially depending on the designated limits, on the resolution of the image and on the position of the shadow on the screen. This solution has the drawback of being very tedious for the operator and very time-consuming to implement since each object appearing in the image must be designated and its size must then be evaluated.

Another solution consists in using image-processing algorithms to detect the outlines of the images of shadows projected by objects and to evaluate the dimensions of the associated object. However, this solution exhibits a fairly low performance in terms of the probability of detection of images of shadows on the screen and in terms of high false alarm rates for noteworthy object detection (i.e. for the association of detected shadows with sought noteworthy objects). Specifically, if the ground is deformed or the image is polluted by multipath echoes (generated by low water height), the shadows are deformed or poorly contrasted. These shadows are then poorly detected or their dimensions are poorly evaluated by these automatic detection algorithms.

The aim of the invention is to mitigate the aforementioned drawbacks.

SUMMARY OF THE INVENTION

For this purpose, one subject of the invention is a device for assisting with the detection of a sought object on the ground, said object having a first preset height h, said device comprising:
- a display device configured to display an image on a screen, the image being generated from echoes measured by a device for imaging reflected waves, the image representing the intensities of echoes generated by an observed zone of the ground under the effect of emission of at least one wave pulse toward the observed zone of the ground, the image extending at least along a distance axis representing the oblique distances separating the reflected-wave imaging device from echo-generating reflectors in the elementary observed zone, the image having a preset distance resolution p, the display device allowing a cursor to be displayed superposed on said image on said screen, said cursor making it possible to designate at least one designated position in the image;
- a human-machine interface comprising a pointer allowing an operator to move the cursor in the image at least along the distance axis; and
- a computational module configured to determine an expected length, along the distance axis, of an expected shadow projected in the image by the sought object assuming that the sought object is positioned at a sighted position on the ground corresponding to the position of the observed zone associated with the position designated by the cursor, the cursor comprising at least one gauge of the expected shadow, the gauge being dimensioned and arranged so as to allow an operator to verify that a shadow projected in the image in the vicinity of the designated position has the expected length along the distance axis.

Advantageously, the expected length is computed from the first height, from an oblique distance separating the sonar from the sighted position on the ground and from a second height dependent on an altitude of the imaging device above the ground.

In a first embodiment, the second height is an altitude of the imaging device above the ground.

The second height may be fixed.

Advantageously, the second height furthermore depends on a difference in altitude between that zone of the ground which is located plumb with the imaging device and the sighted position on the ground.

Advantageously, the expected length w is furthermore determined from a slope b of the ground in the vicinity of the sighted position on the ground.

The expected length may be determined using the following equation:

$$w = \frac{h\rho}{\sin(\alpha - b)}$$

where $$\alpha = \arcsin\left(\frac{H}{r}\right)$$

and where $\rho$ is the distance resolution of the image, H is the second height and r is the oblique distance separating the imaging device and the sighted position on the ground.

Advantageously, the display device allows the gauge to be represented by a first shape in which the gauge comprises an outline bounding a zone having a length substantially equal to the expected length along the distance axis.

Advantageously, the display device allows the gauge to be represented in a first arrangement in which the gauge is centered on the designated position along the distance axis.

Advantageously, the display device allows the gauge to be represented in a second arrangement in which one end of the gauge along the distance axis coincides with the designated position.

Advantageously, which the outline is closed.

As a variant, the image extends along a first axis and along the distance axis, the display device allows the gauge to be represented in a mode in which the cursor designates a plurality of designated positions, all of the designated positions being distributed over a line parallel to the first axis, referred to as the designated line, the computational module determining the expected length at said designated positions, the gauge comprising an outline, the outline comprising a first line parallel to the designated line, the outline comprising a second line, the distance between the first line and the second line along the distance axis being variable and equal, at the coordinates of the respective designated positions along the first axis, to the expected lengths computed for the respective designated positions.

In a first embodiment, the image is produced from measurements issued from a side-looking device for imaging reflected waves, which device is mounted on a carrier, the image comprising a juxtaposition of elementary bands representing echoes issued from elementary observed zones measured by forming respective elementary reception channels, the echoes being generated under the effect of emissions of successive wave pulses as the carrier advances.

As a variant, the image is produced from measurements issued from a three-dimensional imaging device for imaging reflected waves, the image comprising a juxtaposition of elementary bands representing echoes issued from elementary observed zones measured by forming respective elementary reception channels, the echoes being generated under the effect of emission of a wave pulse.

Another subject of the invention is a device for detecting objects on the ground comprising a device for imaging reflected waves and a detection-assisting device according to the invention.

BRIEF DESCRIPTION OF THE DRAWINGS

Other features and advantages of the invention will become apparent on reading the following detailed description, which is given by way of nonlimiting example and with reference to the appended drawings, in which.

From one figure to another, the same elements are referenced by the same references.

DETAILED DESCRIPTION

The invention relates to a device for assisting with the detection, by an operator, of objects on the ground.

Figure 3:
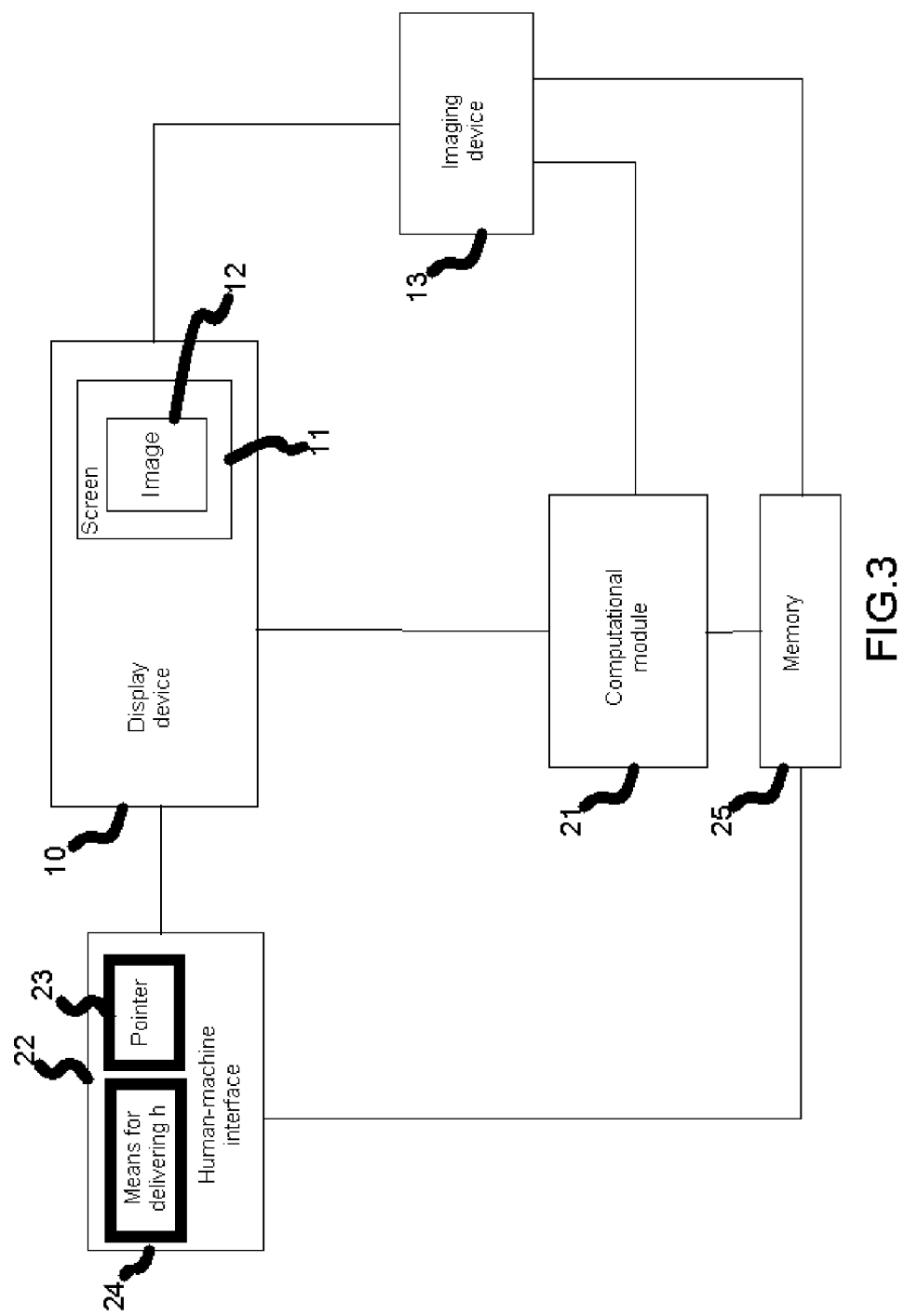
FIG. 3 shows a block diagram of a detection-assisting device according to the invention.

As may be seen in FIG. 3, the device according to the invention comprises a display device 10 configured to display, on a screen 11, an image 12 issued from echoes measured by a device 13 for imaging reflected waves under the effect of emission of at least one wave pulse toward an observed zone of the ground. The display device may be able to generate the image. As a variant, it is the imaging device that generates the image and transmits it to the display device 10 for it to form the display on the screen 11. The device for assisting with the detection of objects may, but does not necessarily, comprise the imaging device 13.

The device 13 for imaging reflected waves may be, as was said above, a sonar, a radar or a lidar. It comprises an emitter able to emit at least one wave pulse with a grazing incidence toward an observed zone on the ground, and a receiver able to measure the echoes issued from the observed zone and generated under the effect of this wave pulse while forming at least one reception channel.

The image 12 represents the intensities of echoes generated by the observed zone of the ground. It extends at least along a distance axis, as was described above. It comprises a juxtaposition of elementary bands Bi such as described above.

Figure 1:
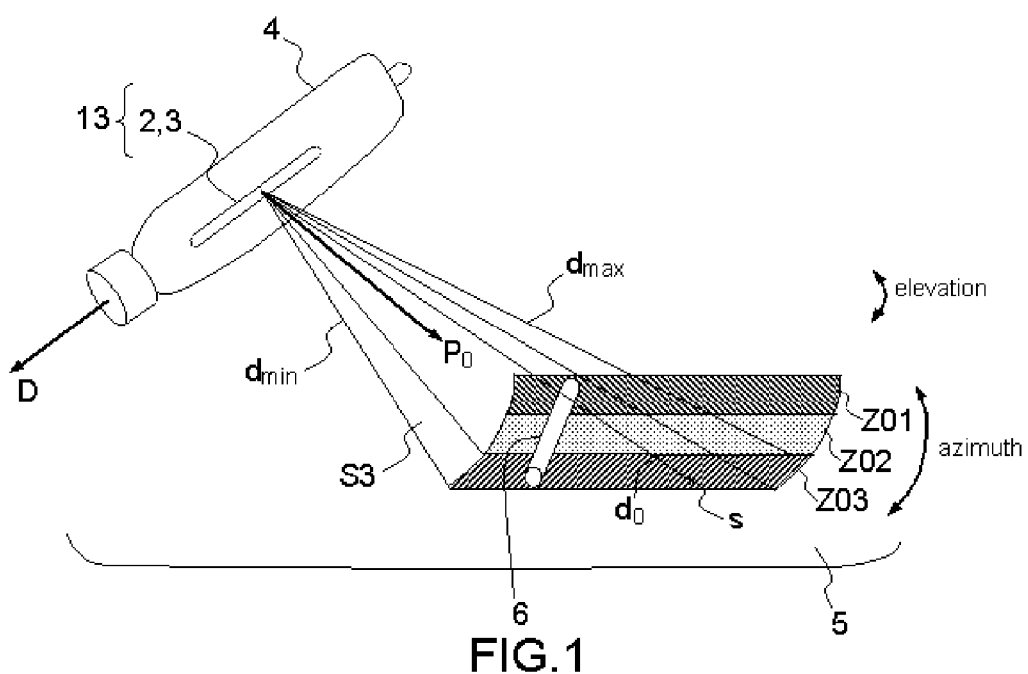
FIG. 1, already described, schematically shows a perspective view of a side-scan sonar and of an associated elementary observation sector.
Figure 2:
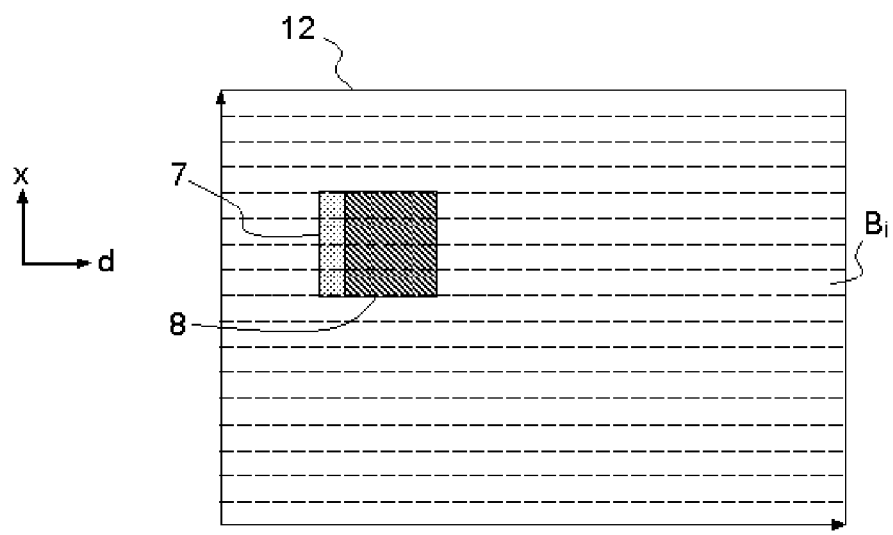
FIG. 2 schematically shows an exemplary image obtained from measurements issued from a side-scan sonar such as shown in FIG. 1.

The imaging device 13 may be a side-scan emission device such as shown in FIG. 1, mounted on a mobile carrier so as to irradiate the ground. In this case, the echoes are acquired, as explained above, by emitting successive wave pulses toward the ground. After each emission, the receiver receives the echoes resulting from the wave pulse and issued from an elementary observed zone ZOi of the ground corresponding to a band of the ground extending laterally relative to the carrier—perpendicularly to the axis of the carrier, for example. If the imaging device advances at a constant speed along a rectilinear path and the wave pulses are emitted at regular time intervals by the sonar, the bands Bi have a constant width and the first axis x is assimilable to a time axis or to a second distance axis of distances parallel to the direction of advance of the carrier relative to a reference point. As a variant, if the speed of the imaging device is not constant and/or the path of the imaging device is not rectilinear, then the width of the bands may vary and/or the longitudinal directions of the bands may not be parallel but instead each may extend longitudinally along their own distance axis. Advantageously, the display device comprises a channel stabilizing system that generates, on the screen, parallel bands of fixed width, the first axis x is then again assimilable to a time axis.

In the rest of the text, for the sake of greater clarity, the invention will be described for the case where the imaging device 13 is a side-scan device, but it will be seen that it is applicable to other types of detecting devices.

The image 12 has a preset distance resolution p along the distance axis, i.e. in the direction of the length of the bands Bi. The resolution $\rho$ (expressed in meters per pixel) corresponds to a number of meters represented per pixel in the image along the distance axis.

Figure 4:
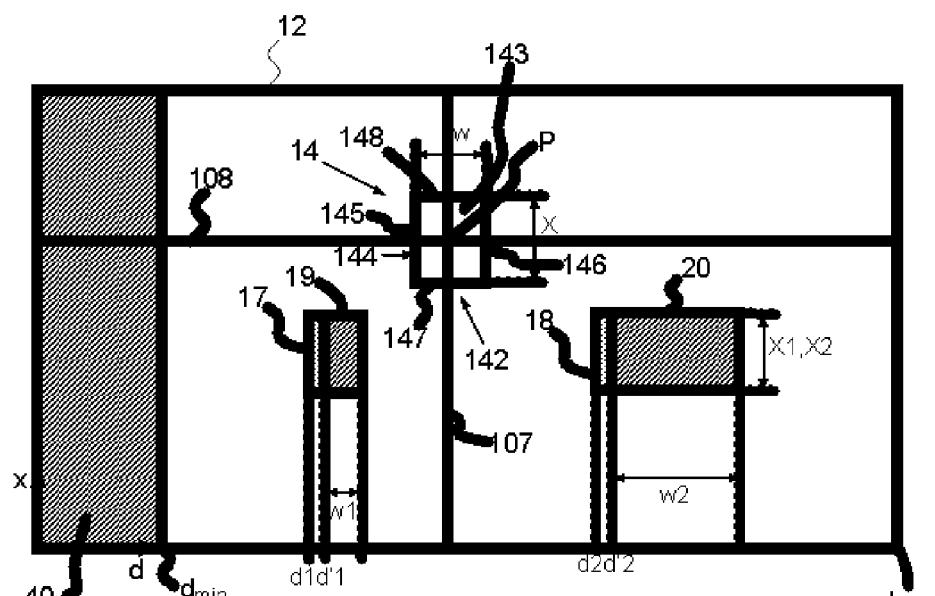
FIG. 4 schematically shows a first exemplary image on which is superposed a cursor having a first shape, a first arrangement and designating a first designated position.
Figure 5:
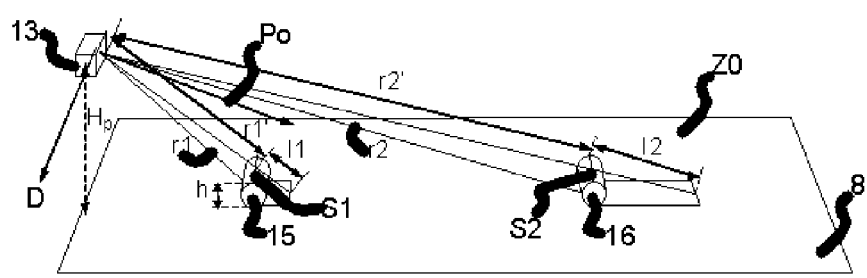
FIG. 5 schematically shows a perspective view of a detection situation allowing the image in FIG. 4 to be obtained.

FIG. 4 shows an exemplary image 12, displayed in a time-distance mode on the screen 11, representing a situation such as shown in FIG. 5. The display device 10 allows, on the screen 11, a cursor 14 to be displayed superposed on the image 12. The cursor 14 allows at least one designated position P to be designated in the image. A designated position is defined by its coordinates on the x and d axes. The cursor 14 comprises a set of elements that are joined to one another and that move together. As may be seen in FIG. 3, the device comprises a human-machine interface 22 comprising a pointer 23 allowing an operator to move the cursor 14 over the screen at least along the distance axis d and, optionally, also along the first axis x so as to move the designated position P. The pointer is, for example, a mouse, a set of buttons or any other means known to those skilled in the art allowing a cursor to be moved over a screen.

FIG. 5 schematically shows an exemplary configuration of a side-scan imaging device 13 moving above a flat seabed 8 (or piece of ground) at a height, referred to as the carrier height Hp, above the flat bed. Two objects 15, 16 of same size and especially of the same height h, referred to as the first height, are located at oblique distances r1 and r2 from the imaging device 13. The oblique distances r1', r2' are the oblique distances between the sonar 13 and the tops S1, S2 of the objects 15, 16. As shown in FIG. 5, the images 17, 18 of the objects 15, 16 are therefore visible in the image 12 between the distances d1 and d'1 and d2 and d'2, respectively, equal respectively to r1*ρ, r1'*ρ, r2*ρ and r2'*ρ. The lengths w1, w2 of the shadows 19, 20 projected by the objects 15, 16 are respectively equal to l1* ρ and l2* ρ. l1 and l2 are the distances between the top of the corresponding objects 15, 16 and the seabed 8 along a straight line connecting the sonar and the top of the object. In the image 12, the objects extend parallel to the direction of advance D, occupy the same position parallel to the direction D, and are spaced apart perpendicularly to the direction D in a plane containing the pointing direction Po. The shadows 19, 20 projected in the image 12 therefore have substantially rectangular shapes of lengths w1 and w2. The shadows have the same width X1, X2 along the first axis x. The length w2 of the shadow 20 projected by the second object 16 is larger than the length w1 of the shadow 19 projected by the first object 15. In other words, the length of the shadow projected by a given object in the image varies especially as a function of the oblique distance between the sonar and the object, i.e. the position of its image along the distance axis. The hatched zone 40 on the left in FIG. 4 shows an absence of emitted echoes the volume of water located between the side-scan imaging device 13 and the seabed 8.

The device according to the invention comprises a computational module 21 configured to determine an expected length w, along the distance axis, of a shadow projected by a preset sought object having a first preset height h and positioned at a sighted position PS on the ground corresponding to the position belonging to the observed zone that is associated with the position P designated by the cursor 14 in the image. The first height is the dimension of the object along a vertical axis defined in a terrestrial frame of reference. The sighted position PS on the ground is defined at least by the oblique distance that separates it from the imaging device corresponding to the coordinate of the position P designated in the image. The position sighted on the ground is a geographical position in a terrestrial frame of reference.

The cursor 14 comprises a gauge 142 of the shadow projected in the image by said sought object. The gauge is dimensioned and arranged so as to allow an operator to verify that a shadow projected in the image in the vicinity of the designated position has the expected length along the distance axis. The term "gauge" is understood to mean a model/shape the dimensions of which are defined so as to allow the dimensions of the shadow in the image 12, at least along the distance axis, to be verified. The gauge is advantageously dimensioned and arranged so as to allow an operator to verify that a shadow projected in the image in the vicinity of the designated position, at least at the coordinate of the pointing direction on the first axis, has the expected length along the distance axis. Advantageously, the gauge 142 has a size substantially equal to the expected length along the distance axis, at least at the coordinate of the designated position along the first axis.

The expected length is computed dynamically depending on the position P designated by the cursor. In other words, when an operator moves the cursor over the image, the length of the gauge automatically changes depending on the position designated by the cursor, and more particularly to the length that the shadow projected by the sought object would have if it were positioned at the position PS on the ground associated with the position P designated by the cursor.

Figure 6:
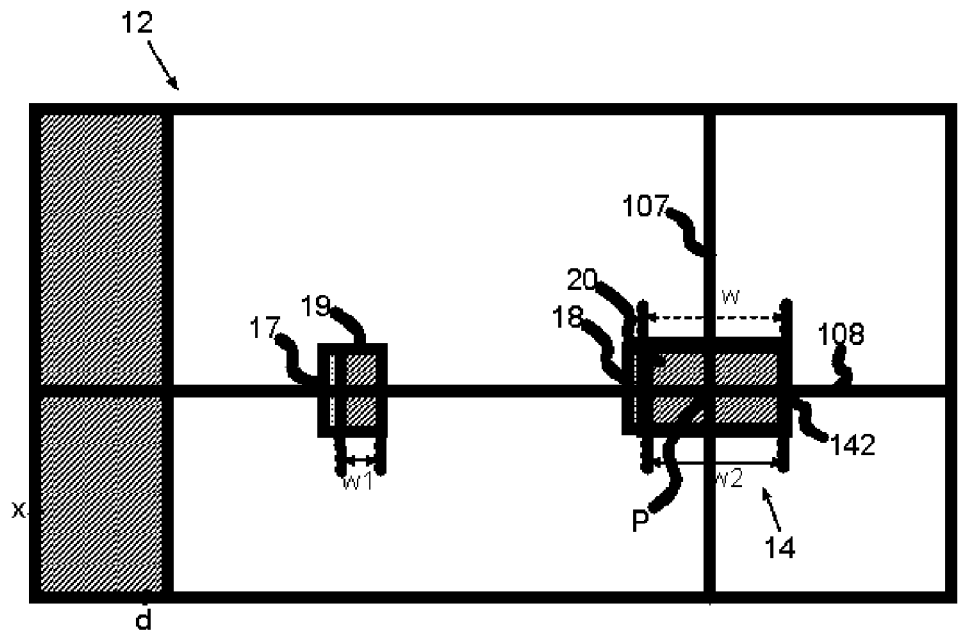
FIG. 6 shows the image in FIG. 4, on which is superposed a cursor comprising a gauge having a first shape, a first arrangement and designating a second designated position.

Therefore, when an operator moves the cursor 14 over the image 12, the computational module 21 computes the expected length, and the display device 10 displays a gauge 142 dimensioned and arranged so as to allow an operator to verify that a shadow projected in the image in the vicinity of the designated position has the expected length along the distance axis. When the cursor 14 is pointed toward a shadow projected on the screen, the size of the gauge automatically changes to the size of the shadow that would be projected in the image by a sought object of preset height h. Moreover, since the gauge 142 forms a portion of the cursor, it moves with the designated position P. If the shadow visible in the image has the same length as that of the gauge, the operator knows instantaneously, without having to perform any computations, that it is representative of the sought object. If the length of a shadow visible in the image level with the cursor is very different to the length of the gauge, the operator knows instantaneously that the shadow has not been generated by the sought object. Therefore, the operator knows instantaneously that any shadow visible in the image on which he places the cursor and that has a length substantially equal to that of the gauge is a shadow generated by an object of size substantially equal to that of the sought object, whatever the position of the cursor on the screen. This is shown in FIG. 6, in which the same image 12 as in FIG. 4 has been shown but in which the cursor 14 has been moved so as to designate a designated position P located at the center of the shadow 20. In this figure, the operator knows instantaneously that the shadow 20 corresponds to the sought object because the length w2 of the shadow 20 along the distance axis d is substantially equal to the length w of the gauge 142. The proposed solution allows the number of false alarms in the detection step to be considerably limited. It also allows the work of detection to be made considerably easier. It is enough for the operator to transmit the first height h corresponding to the height of the sought object to the computational module 21 via the human-machine interface 22, to designate a shadow by means of the cursor and to verify visually whether the shadow has a length similar to that of the gauge. In other words, the proposed solution makes it possible, simply, to detect only contacts the size of which is compatible with the sought object, or threat, the operator merely having to designate and visually analyze any shadows and not having to perform any computations or make any estimations. The proposed solution therefore makes it possible to significantly decrease operator workload, image analysis time and the duration of the step of detection in the image. It also makes it possible to very significantly decrease false alarm rate, i.e. the detection, by the operator, of contacts not corresponding to the sought object.

The expected length w is computed from the first height h of the sought object. The human-machine interface 22 comprises means 24 allowing an operator to deliver the first height h to the computational module 21. The expected length w is also computed from the oblique distance r to an object on the ground located at the sighted position PS on the ground corresponding to the designated position P, and from a second height H dependent on an altitude Hp of the imaging device 13 above the ground. This altitude Hp is the distance between the imaging device and that zone of the ground which is located plumb with the imaging device, along the vertical axis z.

The length w of the gauge is then representative of the length of the shadow projected in the image 12 by an object having a first height h and located at the position of the ground corresponding to the position P designated in the image when the imaging device 13 is located at a given altitude above the ground. This computational method makes it possible to take into account the height of the sought object and the relative positions of the imaging device and the ground. It allows the expected length to be obtained with a good reliability.

The expected length w may be computed in the following way at a designated position P in the image 12 associated with a sighted position PS on the ground:

$$w = \frac{h\rho r}{H} \quad [1]$$

Figure 7:
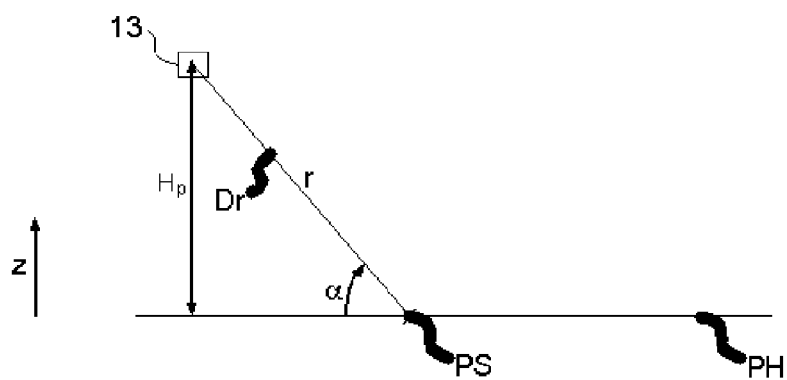
FIG. 7 schematically shows the variables used to compute expected length.

The various variables of equation [1] are shown in FIG. 7, except the first height h which is shown in FIG. 5.

h is the first height of the sought object along a vertical axis z in a terrestrial frame of reference. This height is expressed in meters.

ρ, expressed in meters per pixel, is the resolution of the image along the distance axis d. The resolution p may be transmitted to the computer by the display device 10 or may be entered into a memory 25 by an operator by means of inputting means 24 of the human-machine interface 22.

The oblique distance r may also be computed by the computational module 21 depending on the coordinate of the designated position along the distance axis and the resolution ρ.

The second height may be equal to an altitude Hp. In this case, the second height H may be fixed, i.e. independent of the designated position in the image. This is for example the case if the carrier is considered to be located at a constant altitude Hp above the ground, which is considered to be flat. This altitude Hp is transmitted to the computational module 21 as an input datum, for example, by the imaging device 13, or by an operator by way of the human-machine interface 22. It is for example an altitude setpoint of the carrier above the ground given to the carrier during the data acquisition.

As a variant, the second height H depends on the position P designated by the cursor 14 in the image 12. This configuration allows the expected lengths to be computed with greater precision and the rate of false alarms generated by the operator in the detection step to be decreased. It may be equal to a height Hp of the imaging device 13 above the ground substantially at the instant of emission. This height Hp may be a measurement or a setpoint. The second height H may depend on the altitude Hp and on an altitude difference between that zone of the ground which is located plumb with the imaging device and the sighted position PS on the ground at the instant of emission of the wave pulse exciting the echo originating from the sighted position PS on the ground. The second height H is preferably substantially equal to an altitude difference separating the imaging device and the sighted position PS on the ground, i.e. the distance, along the vertical axis, separating the sighted position PS on the ground from the imaging device. This altitude difference is preferably taken substantially at the corresponding instant of emission. This is the computation that gives the best reliability. The imaging device 13 advantageously comprises an altitude sensor allowing the altitude Hp of the imaging device to be determined at the various instants of emission and this altitude Hp to be stored in the memory 25. As a variant, the imaging device comprises a second module allowing the altitude Hp of the imaging device to be computed from a depth of the seabed, from the length of the cable between the carrier and a surface vessel towing the carrier at the various instants of acquisition and from the speed of the surface vessel. In the case where the second height H is the distance, along the vertical axis, separating the point PS from the imaging device 13 at the corresponding instant of emission, the computational module 21 must be able to compute this second height at the various instants of acquisition. It is for example calculated from a bathymetric chart of the ground, from the absolute position of the sonar, in a terrestrial frame of reference, at the various instants of emission, from the altitude Hp of the imaging device 13 at the various instants of emission and from the pointing direction Po. The imaging device 13 advantageously comprises position sensors allowing the absolute position of the imaging device 13 at the various instants of emission and the altitude Hp of the imaging device 13 at the various instants of emission to be determined and these positions and altitudes to be stored in the memory 25. A bathymetric chart of the ground is advantageously stored in the memory 25. As a variant, the distance, along the vertical axis, separating the point PS from the imaging device 13 at the corresponding instant of emission, is computed by interferometry.

Advantageously, the expected length w is furthermore computed from a slope of the ground in the vicinity of the sighted position PS on the ground. Specifically, the size of the image of the shadow projected by an object of given size in the image depends very strongly on this slope. If the slope is upward, the size of the shadow will be smaller than if the slope is downward.

The length w of the gauge is then calculated in the following way:

$$w = \frac{h\rho}{\sin(\alpha - b)} \quad [2]$$

The slope angle b is the oriented angle of the slope of the ground in the vicinity of the sighted position PS on the ground. It is the angle made from a horizontal plane passing through the sighted position PS on the ground, to a straight line tangential to the ground; it is positive if made in the clockwise direction. This angle is advantageously the angle of the slope of the ground in the vicinity of the sighted position PS on the ground in the opposite direction to the imaging device at the instant of emission of the incident wave pulse exciting the echo measured by the imaging device and generated for the sighted position PS on the ground.

The grazing angle α is computed using the following formula:

$$\alpha = \arcsin\left(\frac{H}{r}\right) \quad [3]$$

b and α are expressed in radians.

α is the grazing angle of the object located at the sighted position PS, i.e. the oriented angle formed from a horizontal plane PH, in a terrestrial frame of reference, passing through the sighted position PS on the ground (this plane is perpendicular to the plane of the paper in FIG. 6) to a straight line Dr connecting the position PS on the ground and the imaging device 13. This angle is preferably measured substantially at the instant of emission of the wave pulse that excites the echoes measured for the elementary observed zone in which the position PS on the ground is located. In other words, this instant of emission is the instant of emission of the incident pulse that excites an echo originating from the sighted position PS on the ground.

Figure 8:
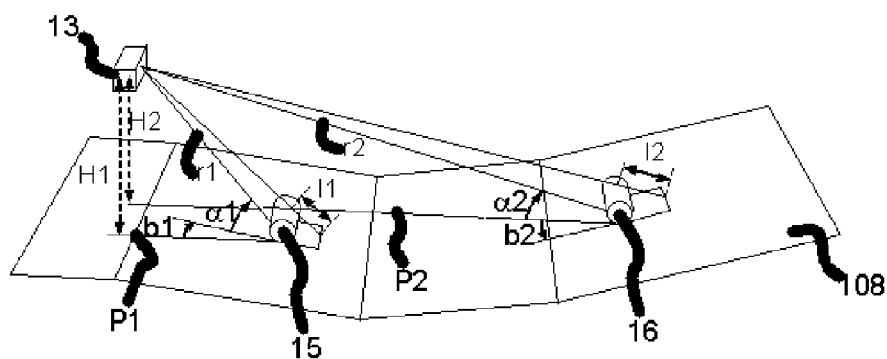
FIG. 8 schematically shows a perspective view of a detection situation in which the ground is not flat.

FIG. 8 shows first and second slope angles b1 and b2 for two objects 15, 16 on an inclined bed 108 and the associated grazing angles $\alpha_1$ and $\alpha_2$ and the first and second horizontal planes P1 and P2 passing through the objects 15, 16.

The slope angle b for a sighted position PS on the ground is, for example, computed by the computational module 21 by means of a bathymetric chart.

As may be seen in FIGS. 4 and 6, the cursor 14 comprises a designating symbol 107, 108 symbolizing the position P designated by the cursor 14. This designating symbol comprises, in the nonlimiting example of FIG. 8, a first designating line 107 parallel to the first axis x, and a second designating line 108 parallel to the distance axis d. The point of intersection between the designating lines 107, 108 being the designated position P.

In the example in FIGS. 4 and 6, the gauge 142 has a first shape in which it comprises an outline 144 bounding a zone 143 having the expected length, along the distance axis. In other words, the gauge has substantially the expected length, to within the thickness of the outline. The zone 143 bounded by the outline 144 is the expected shadow that would be projected in the image by an object, having a height equal to the sought object, if it were positioned at the sighted position PS on the ground associated with the position P designated by the cursor.

As may be seen in FIG. 4, the gauge 142 comprises first limits bounding the expected shadow along the distance axis. The first limits comprise a first line 145 and a second line 146 bounding the expected shadow 143 along the distance axis. The lines 145, 146 are parallel to the first axis and separated from each other by a fixed distance, along the distance axis, corresponding substantially to the expected length w. In the case of the side-scan imaging device, the first axis x1 is a line segment and the lines 145, 146 are line segments parallel to the first axis x1. In the embodiment in FIG. 4, the outline 144 is a closed outline comprising second limits bounding the expected shadow 143 of the shadow along the first axis x. The second limits comprise a third line 147 and a fourth line 148 that lie parallel to the distance axis d and bound the expected shadow 143 of the shadow along the first axis x. In the embodiment in FIG. 4, the lines 147, 148 are parallel to the distance axis and separated from each other by a distance X corresponding to the width of the gauge 142 to within the thickness of the outline. The outline 144 is rectangular. The width X of the gauge is preset. It is delivered as an input datum to the computational module 21, for example by means of the human-machine interface. It advantageously corresponds to a maximum size that the shadow of the sought object may have, in the image, along the first axis.

In the embodiment in FIGS. 4 and 6, the arrangement of the gauge is of the centered type. The gauge is centered on the designated position P. In other words, the designated position is located at the center of the gauge at least along the distance axis, i.e. in the direction of the length of the bands Bi. In other words, the ends of the gauge on the distance axis are each located at the same distance from the designated position P, along the distance axis and, optionally, along the first axis as shown in FIG. 6. The ends of the gauge 142 on the distance axis are the lines 145 and 146 in FIG. 8. An operator is easily able to identify whether a shadow is generated by the sought object by pointing to the center of this image as visible in FIG. 4. The image of the shadow is generated by an object having the same height as the sought object if it extends within the outline and if the size of the shadow, at least along the x-axis, is substantially equal to the length of the gauge 142 or to the size of the zone 143.

Figure 9:
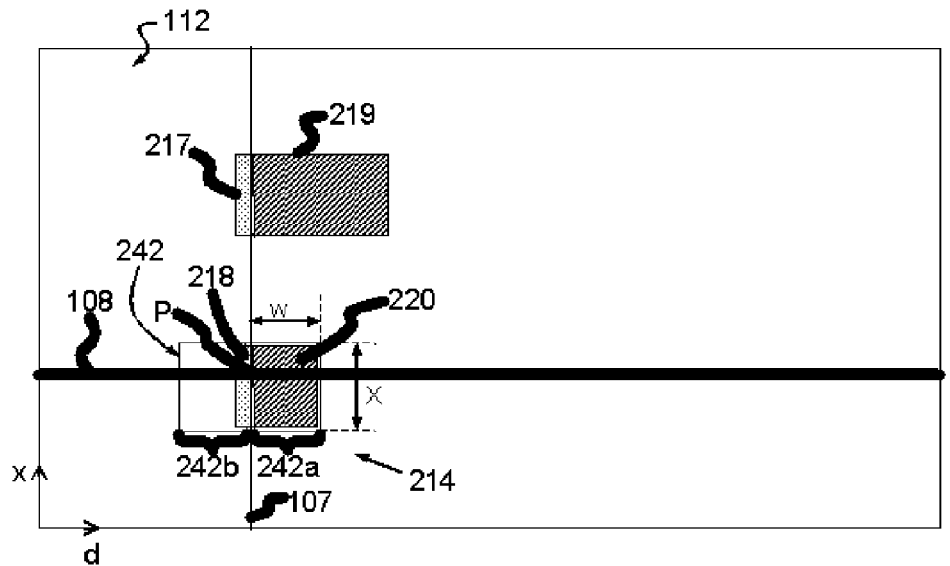
FIG. 9 shows a second exemplary image in which the cursor comprises two gauges having the first shape and a second arrangement.

In FIG. 9, another image 112, on which is superposed another type of cursor 214 comprising a differently-arranged gauge 242, is shown. In this figure, two shadows 219 and 220 and images 217, 218 of associated objects are shown in a different configuration from that in FIGS. 4 to 6. In this figure, the cursor 242 comprises two gauges 242a, 242b having a length substantially equal to w. The gauges 242a, 242b are located on either side of the designated position P. They have the same shape as the gauge in FIG. 4. The arrangement of the gauges 242a, 242b is of the decentered type, decentered along the distance axis d. Each gauge is arranged so that the designated position P is located at one end of each of the gauges along the distance axis. This arrangement allows the operator to evaluate whether the image of a shadow 219, 220 is generated by an object having the same height as the sought object by placing the limit between the image of an object (bright echo) 217, 218 and the associated shadow 219, 220. In this figure, the gauges are centered on the designated position along the first axis. One variant of a decentered arrangement is a variant in which the cursor comprises a single decentered gauge.

Figure 10:
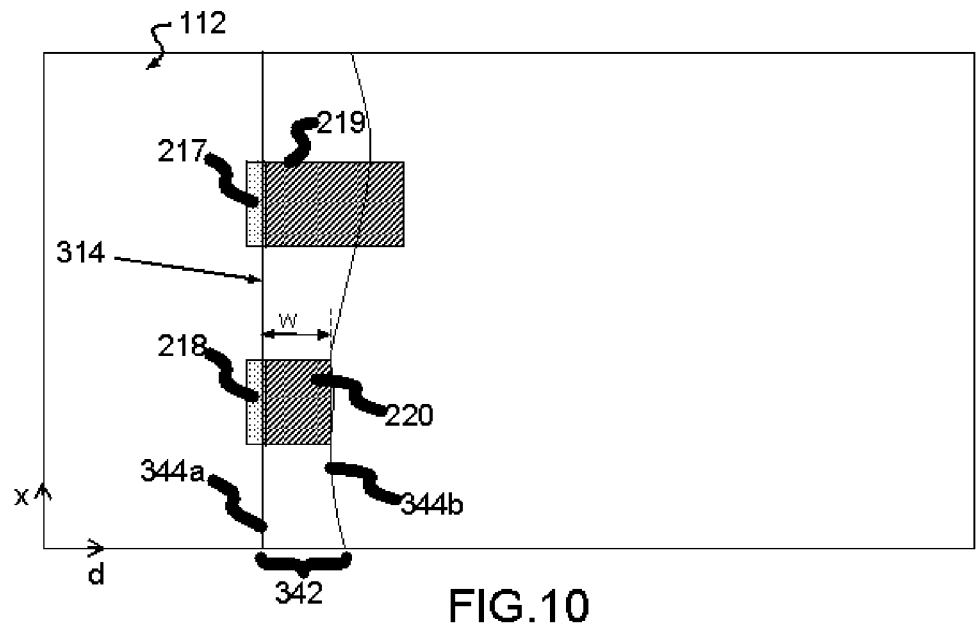
FIG. 10 shows the second exemplary image, in which the cursor comprises a gauge having a second shape.

FIG. 10 shows another type of cursor 314. The arrangement of the gauge 342 is of the decentered type, decentered along the distance axis d. The gauge 342 is arranged so that the designated position P is located at one end of the gauge 342 along the distance axis. In the embodiment in FIG. 10, the gauge 342 comprises an open outline formed by two lines 344a, 344b. The cursor 314 designates a plurality of designated positions in the image 112, which positions are distributed over a straight line, referred to as the designated line, parallel to the first axis x, and here extending, though it does not necessarily, right across the image. This designated line is a first line of the gauge 344a. The computational module 21 determines the expected length at each designated position. The outline comprises a second line 344b, the distance between the two lines along the distance axis is variable along the first axis. This distance is equal, at the coordinates of the respective positions along the first axis, to the expected lengths computed for the designated positions. In FIG. 10, since the first line is parallel to the first axis, the oblique distance between each sighted position on the ground and the sonar is fixed. However, the distance between the lines 334a, 344b varies along the first axis, as a function of the coordinate on the first axis. This means that the height of the sonar relative to the ground and/or the altitude of the bed and/or the slope of the bed vary along the first axis. This embodiment allows an operator to see, without the operator having to move the cursor, whether images of shadows located along the first axis are generated by an object of similar height to that of the sought object. This embodiment therefore makes it possible to increase the rapidity with which images are processed by an operator in the detection step. For example, in FIG. 10, the second shadow 220 coincides with the limits of the gauge 342 whereas the first shadow 219 has a length that is clearly larger than the gauge, it is therefore not generated by an object of similar size to that of the sought object. As a variant, the gauge shown in FIG. 10 could be decentered.

In this embodiment, the cursor is movable only along the distance axis whereas it is movable along both axes in the other examples.

As a variant, the gauge is a line segment extending along the distance axis d, i.e. along an elementary band, and has a length equal to the expected length. The length of the segment changes depending on the position designated by the cursor.

Advantageously, the human-machine interface 22 allows an operator to choose a shape and/or an arrangement and/or a number of gauges to display on the screen.

The invention has been described for the case of images generated by a side-scan imaging device extending in an orthogonal coordinate system. In the example described, each elementary band Bi is a representation of the intensities of echoes generated by an elementary observation zone ZOi under the effect of an incident wave pulse, the echoes being measured by forming a single elementary reception channel. As a variant, each elementary band Bi is a representation of the intensities of echoes generated by an elementary observation zone ZOi under the effect of a plurality of wave pulses, the echoes being measured by forming a single elementary reception channel. In other words, each elementary channel is formed from echoes generated in an elementary observed zone under the effect of a plurality of elementary wave pulses.

Figure 11:
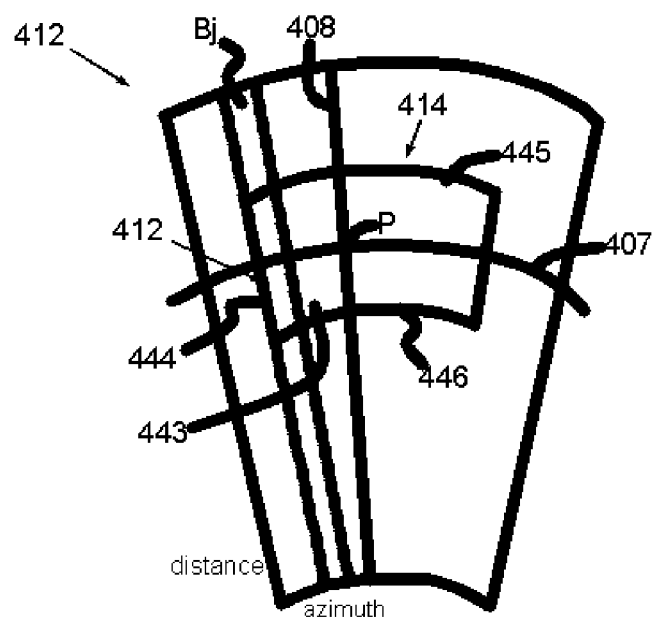
FIG. 11 shows an example of a form of image obtained by emitting a single pulse from a three-dimensional imaging device.

The invention also applies to images generated by a three-dimensional imaging device producing an image of an observed zone of the ground by emitting a single incident wave pulse toward the ground and by measuring the reflected echoes while forming a plurality of elementary reception channels. Each elementary reception channel images an elementary observed zone represented in the image by an elementary band Bj as shown in FIG. 11. This is for example the case of a forward-scan sonar. The image obtained 412 is an image of the azimuth/distance type. An example of a form of image of the azimuth/distance type is shown in FIG. 11. The image takes the form of a ring segment, but may also be cone-shaped. In this case, the first and second axes form a polar coordinate system. The first axis is an azimuthal axis, i.e. an angular axis. It is advantageously arc-shaped. The distance axis is a radial axis. In the case where the gauge 442 comprises a closed outline 444 bounding a zone 443 in which an image of a shadow having a length equal to the expected length must fit, those first and second lines 445, 446 of the outline which are parallel to the first axis are parallel arcs that are spaced apart from each other by the expected length. The third and fourth lines 447, 448 bounding the expected shadow along the azimuthal axis are segments of radii of circle of center O. The gauge 442 may also have the shape of a line segment having the expected length and extending along the circle radius passing through the designated position. As a variant, the azimuthal/distance coordinate system could be orthogonal.

In this patent application the size of the gauge along the distance axis d was referred to as the length of the gauge, this size may be larger or smaller than that size of the gauge, along the first axis, which was referred to as width.

The invention claimed is:

1. A device for assisting with the detection of a sought object on the a ground, said object having a first preset height h, said device comprising:

a display device configured to display an image on a screen, the image being generated from echoes measured by a device for imaging reflected waves, the image representing intensities of echoes generated by an observed zone of the ground under the effect of emission of at least one wave pulse toward the observed zone of the ground, the image extending at least along a distance axis (d) representing oblique distances (do) separating the reflected-wave imaging device from echo-generating reflectors, the image having a preset distance resolution p, the display device allowing a cursor to be displayed superposed on said image on said screen, said cursor making it possible to designate at least one designated position (P) in the image;

a human-machine interface comprising a pointer allowing an operator to move the cursor in the image at least along the distance axis (d); and a computational module configured to determine an expected length w, along the distance axis (d), of an expected shadow projected in the image by the sought object having the first height h, where the first height his a dimension of the sought object along a vertical axis of a terrestrial reference frame, assuming that the sought object is positioned at a sighted position (PS) on the ground corresponding to the position of the observed zone associated with the position (P) designated by the cursor, the cursor comprising at least one gauge of the expected shadow, the gauge being dimensioned and arranged so as to allow an operator to verify that a shadow projected in the image in a vicinity of the designated position (P) has the expected length along the distance axis (d).

2. A device for assisting with the detection of a sought object on a ground, said object having a first preset height h, said device comprising:

a display device configured to display an image on a screen, the image being generated from echoes measured by a device for imaging reflected waves, the image representing intensities of echoes generated by an observed zone of the ground under the effect of emission of at least one wave pulse toward the observed zone of the ground, the image extending at least along a distance axis (d) representing oblique distances (do) separating the reflected-wave imaging device from echo-generating reflectors, the image having a preset distance resolution p, the display device allowing a cursor to be displayed superposed on said image on said screen, said cursor making it possible to designate at least one designated position (P) in the image;

a human-machine interface comprising a pointer allowing an operator to move the cursor in the image at least along the distance axis (d); and a computational module configured to determine an expected length w, along the distance axis (d), of an expected shadow projected in the image by the sought object assuming that the sought object is positioned at a sighted position (PS) on the ground corresponding to the position of the observed zone associated with the position (P) designated by the cursor, the cursor comprising at least one gauge of the expected shadow, the gauge being dimensioned and arranged so as to allow an operator to verify that a shadow projected in the image in a vicinity of the designated position (P) has the expected length along the distance axis (d), in which the expected length is calculated from the first height h, from an oblique distance separating a sonar from the sighted position (PS) on the ground and from a second height H dependent on an altitude Hp of the imaging device above the ground.

3. The device as claimed in claim 2, in which the second height is an altitude Hp of the imaging device above the ground.

4. The device as claimed in claim 2, in which the second height H is fixed.

5. The device as claimed in claim 2, in which the second height furthermore depends on a difference in altitude between that zone of the ground which is located plumb with the imaging device and the sighted position (PS) on the ground.

6. The device as claimed in claim 2, in which the expected length w is furthermore determined from a slope b of the ground in a vicinity of the sighted position on the ground.

7. The device as claimed in claim 6, in which the expected length is determined using the following equation:

$$w = \frac{h\rho}{\sin(\alpha - b)}$$

where $$\alpha = \arcsin\left(\frac{H}{r}\right)$$

and where p is the distance resolution of the image, H is the second height and r is the oblique distance separating the imaging device and the sighted position on the ground.

8. The device as claimed in claim 1 or claim 2, in which the display device allows the gauge to be represented by a first shape in which the gauge comprises an outline bounding a zone having a length substantially equal to the expected length along the distance axis.

9. The device as claimed in claim 8, in which the outline is closed.

10. The device as claimed in claim 8, in which the image extends along a first axis and along the distance axis, the display device allows the gauge to be represented in a mode in which the cursor designates a plurality of designated positions, all of the designated positions being distributed over a line parallel to the first axis, referred to as the designated line, the computational module determining the expected length at said designated positions, the gauge comprising an outline, the outline comprising a first line parallel to the designated line, the outline comprising a second line, the distance between the first line and the second line along the distance axis being variable and equal, at the coordinates of the respective designated positions along the first axis, to the expected lengths calculated for the respective designated positions.

11. The device as claimed in claim 1 or claim 2, in which the display device allows the gauge to be represented in a first arrangement in which the gauge is centered on the designated position (P) along the distance axis (d).

12. The device as claimed in claim 1 or claim 2, in which the display device allows the gauge to be represented in a second arrangement in which one end of the gauge along the distance axis coincides with the designated position.

13. The device as claimed in claim 1 or claim 2, in which the image is produced from measurements issued from a side-looking device for imaging reflected waves, which device is mounted on a carrier, the image comprising a juxtaposition of elementary bands representing echoes issued from elementary observed zones measured by forming respective elementary reception channels, the echoes being generated under the effect of emissions of successive wave pulses as the carrier advances.

14. The device as claimed in claim 13, in which the image is produced from measurements issued from a three-dimensional imaging device for imaging reflected waves, the image comprising a juxtaposition of elementary bands representing echoes issued from elementary observed zones measured by forming respective elementary reception channels, the echoes being generated under the effect of emission of a wave pulse.

15. A device for detecting objects on the ground comprising a device for imaging reflected waves and a detection-assisting device as claimed in claim 13.

16. The device as claimed in claim 2, wherein the height h is the dimension of the sought object along a vertical axis of a terrestrial reference frame.

17. A device for assisting with the detection of a sought object on a ground, said object having a first preset height h, said device comprising:
a display device configured to display an image on a screen, the image being generated from echoes measured by a device for imaging reflected waves, the image representing intensities of echoes generated by an observed zone of the ground under the effect of emission of at least one wave pulse toward the observed zone of the ground, the image extending at least along a distance axis (d) representing oblique distances (do) separating the reflected-wave imaging device from echo-generating reflectors, the image having a preset distance resolution p, the display device allowing a cursor to be displayed superposed on said image on said screen, said cursor making it possible to designate at least one designated position (P) in the image;
a human-machine interface comprising a pointer allowing an operator to move the cursor in the image at least along the distance axis (d); and
a computational module configured to determine an expected length w, along the distance axis (d), of an expected shadow projected in the image by the sought object assuming that the sought object is positioned at a sighted position (PS) on the ground corresponding to the position of the observed zone associated with the position (P) designated by the cursor, the cursor comprising at least one gauge of the expected shadow, the gauge being dimensioned and arranged so as to allow an operator to verify that a shadow projected in the image in a vicinity of the designated position (P) has the expected length along the distance axis (d), in which
the image is produced from measurements issued from a side-looking device for imaging reflected waves, which device is mounted on a carrier, the image comprising a juxtaposition of elementary bands representing echoes issued from elementary observed zones measured by forming respective elementary reception channels, the echoes being generated under the effect of emissions of successive wave pulses as the carrier advances.

18. A device for assisting with the detection of a sought object on a ground, said object having a first preset height h, said device comprising:
a display device configured to display an image on a screen, the image being generated from echoes measured by a device for imaging reflected waves, the image representing intensities of echoes generated by an observed zone of the ground under the effect of emission of at least one wave pulse toward the observed zone of the ground, the image extending at least along a distance axis (d) representing oblique distances (do) separating the reflected-wave imaging device from echo-generating reflectors, the image having a preset distance resolution p, the display device allowing a cursor to be displayed superposed on said image on said screen, said cursor making it possible to designate at least one designated position (P) in the image;

a human-machine interface comprising a pointer allowing an operator to move the cursor in the image at least along the distance axis (d); and a computational module configured to determine an expected length w, along the distance axis (d), of an expected shadow projected in the image by the sought object assuming that the sought object is positioned at a sighted position (PS) on the ground corresponding to the position of the observed zone associated with the position (P) designated by the cursor, the cursor comprising at least one gauge of the expected shadow, the gauge being dimensioned and arranged so as to allow an operator to verify that a shadow projected in the image in a vicinity of the designated position (P) has the expected length along the distance axis (d), in which the display device allows the gauge to be represented by a first shape in which the gauge comprises an outline bounding a zone having a length substantially equal to the expected length along the distance axis, and the image extends along a first axis and along the distance axis, the display device allows the gauge to be represented in a mode in which the cursor designates a plurality of designated positions, all of the designated positions being distributed over a line parallel to the first axis, referred to as the designated line, the computational module determining the expected length at said designated positions, the gauge comprising an outline, the outline comprising a first line parallel to the designated line, the outline comprising a second line, the distance between the first line and the second line along the distance axis being variable and equal, at the coordinates of the respective designated positions along the first axis, to the expected lengths calculated for the respective designated positions.

* * * * *

UNITED STATES PATENT AND TRADEMARK OFFICE
CERTIFICATE OF CORRECTION

PATENT NO. : 10,228,812 B2
APPLICATION NO. : 14/909569
DATED : March 12, 2019
INVENTOR(S) : Julien Ferrand et al.

Page 1 of 1

It is certified that error appears in the above-identified patent and that said Letters Patent is hereby corrected as shown below:

In the Claims

In Claim 1, Column 13, Line 66, "on the a ground" should be --on a ground--.
In Claim 16, Column 16, Line 17, "his the dimension" should be --h is the dimension--.

Signed and Sealed this
Eleventh Day of June, 2019

Andrei Iancu
*Director of the United States Patent and Trademark Office*